(12) United States Patent
Reid

(10) Patent No.: US 8,465,061 B1
(45) Date of Patent: Jun. 18, 2013

(54) TRACTION SYSTEM

(76) Inventor: Donald J. Reid, Smithtown, NY (US)

( * ) Notice: Subject to any disclaimer, the term of this patent is extended or adjusted under 35 U.S.C. 154(b) by 141 days.

(21) Appl. No.: 13/221,571

(22) Filed: Aug. 30, 2011

Related U.S. Application Data

(63) Continuation-in-part of application No. 12/324,366, filed on Nov. 26, 2008, now abandoned.

(51) Int. Cl.
*B60B 39/02* (2006.01)
*B60B 39/10* (2006.01)

(52) U.S. Cl.
USPC ............................................. 291/38; 291/23

(58) Field of Classification Search
USPC ................... 291/38, 39, 40, 30, 23; 222/138, 222/129, 152.7, 145.1, 145.5, 478, 481, 482, 222/485, 502, 528, 529, 531, 533, 536, 537, 222/556, 557
See application file for complete search history.

(56) References Cited

U.S. PATENT DOCUMENTS

| | | | |
|---|---|---|---|
| 1,046,623 A | 12/1912 | McDougall | |
| 1,648,623 A | 11/1927 | Robinson | |
| 1,784,323 A | 12/1930 | Wallace | |
| 2,256,290 A * | 9/1941 | McCune | 291/38 |
| 2,999,711 A | 9/1961 | Sturmer | |
| 3,441,225 A * | 4/1969 | Cotter | 239/683 |
| 3,774,945 A | 11/1973 | Lee et al. | |
| 3,827,736 A * | 8/1974 | Mango | 291/20 |
| 4,036,516 A | 7/1977 | Oldham | |
| 4,968,069 A | 11/1990 | Jensen | |
| 5,118,142 A | 6/1992 | Bish | |
| 5,205,695 A * | 4/1993 | Katsui | 414/196 |
| D364,173 S | 11/1995 | Woods | |
| 6,012,746 A | 1/2000 | Birdwain | |
| 6,112,956 A | 9/2000 | Malone | |
| 2003/0205902 A1* | 11/2003 | Carlson | 291/38 |

\* cited by examiner

*Primary Examiner* — Mark Le

(57) ABSTRACT

A traction system featuring a housing with two or more reservoirs adapted to hold traction substances. The bottom of the housing is at a first angle causing the traction substances to collect in the dispensing portion of the housing. Outlet holes are disposed in the dispensing portion of the housing for each reservoir. A pair of doors temporarily covers the outlet holes. When the doors are in the open position, the doors are at angles such that the traction substances mix together as they are dispensed.

10 Claims, 6 Drawing Sheets

TRACTION SYSTEM

CROSS REFERENCE

This application is a continuation-in-part of U.S. patent application Ser. No. 12/324,366 filed Nov. 26, 2008, the disclosure of which is incorporated herein by reference in its entirety.

FIELD OF THE INVENTION

The present invention is directed to a system for delivering a traction substance to tires of a vehicle if the vehicle is stuck in snow, mud, or ice.

BACKGROUND OF THE INVENTION

System for increasing friction or traction between tires of a vehicle and slippery road surfaces include mats that are placed under the vehicle tires and complex mechanical systems using heaters or pneumatic conveying systems and the like. Some of these systems require the user to exit her/her vehicle. Exiting the vehicle during slippery conditions (e.g., icy roadways) presents a potential safety hazard. The present invention features a traction system for delivering a traction substance to a wheel of a vehicle.

SUMMARY

The present invention features a traction system. In some embodiments, the traction system comprises a housing having a first side, a second side, a top surface, a bottom surface, and an inner cavity, the inner cavity is divided into at least a first reservoir and a second reservoir separated by an internal wall, the reservoirs are each adapted to hold a traction substance, the bottom surface of the housing is at a first angle with respect to the second side of the housing causing the traction substance to collect in a dispensing portion of the housing; a top aperture disposed in the top surface of the housing, the top aperture provides access to the reservoirs; a first outlet hole disposed in the dispensing portion of the housing and providing access to the first reservoir and a second outlet hole disposed in the dispensing portion of the housing and providing access to the second reservoir; a first door pivotally attached to the housing for temporarily covering the first outlet hole and a second door pivotally attached to the housing for temporarily covering the second outlet hole, the doors are positioned opposite each other such that a free end of the first door faces a free end of the second door, the doors can move between at least an open position and a closed position respectively allowing and preventing access to the outlet holes, when the doors move to the open position the free ends of the doors move away from each other, in the open position the first door is at a first door angle with respect to the dispensing portion of the housing and the second door is at a second door angle with respect to the dispensing portion of the housing, the first door angle and the second door angle are each between about 10 to 80 degrees; and a door release apparatus adapted to move the doors between at least the open position and the closed position, wherein the door angles of the doors in the open position allow the traction substances to mix as they are dispensed.

In some embodiments, the traction substance comprises sand, gravel, dry ice, kitty litter, or a combination thereof. In some embodiments, the first angle is between about 100 to 170 degrees. In some embodiments, the first angle is between about 120 to 160 degrees. In some embodiments, the first angle is between about 140 to 160 degrees. In some embodiments, a mounting bracket is disposed on the first side or the second side of the housing. In some embodiments, a cap is removably attached to the top aperture, the cap can move between at least an open position and a closed position respectively allowing and preventing access to the top aperture.

In some embodiments, the first door angle or the second door angle is between about 10 to 70 degrees. In some embodiments, the first door angle or the second door angle is between about 20 to 70 degrees. In some embodiments, the first door angle or the second door angle is between about 30 to 60 degrees. In some embodiments, the first door angle and the second door angle are about equal. In some embodiments, the first door angle and the second door angle are both about 45 degrees.

In some embodiments, the door release apparatus is disposed on the bottom surface of the housing. In some embodiments, the door release apparatus comprises a motor and a pivot arm, the pivot arm is operatively connected to each the first door, the second door, and to the motor, the motor is adapted to move the pivot arm between a first position and a second position, wherein when the pivot arm is in the first position the pivot arm is pushed in the direction of the door such that the door moves to the closed position and when the pivot arm is in the second position the pivot arm is pulled in the direction of the second side of the housing such that the door moves to the open position.

In some embodiments, the motor is operatively connected to a power source. In some embodiments, the system further comprises a control switch and a microprocessor, wherein microprocessor is operatively connected to both the control switch and the motor. In some embodiments, when the control switch is moved to an off position the control switch sends a first input signal to the microprocessor whereupon the microprocessor sends a first output command to the motor to cause the motor to move the pivot arm to the first position and the door to the closed position and when the control switch is moved to an on position the control switch sends a second input signal to the microprocessor whereupon the microprocessor sends a second output command to the motor to cause the motor to move the pivot arm to the second position and the door to the open position. In some embodiments, when the control switch is moved to an intermittent position the control switch sends a third input signal to the microprocessor whereupon the microprocessor sends a third output command to the motor to cause the motor to move the pivot arm to the second position and the door to the open position intermittently.

In some embodiments, the system further comprises a wheel well of a vehicle, wherein the housing is installed in the wheel well via an attachment means. In some embodiments, the attachment means comprises a mounting bracket.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
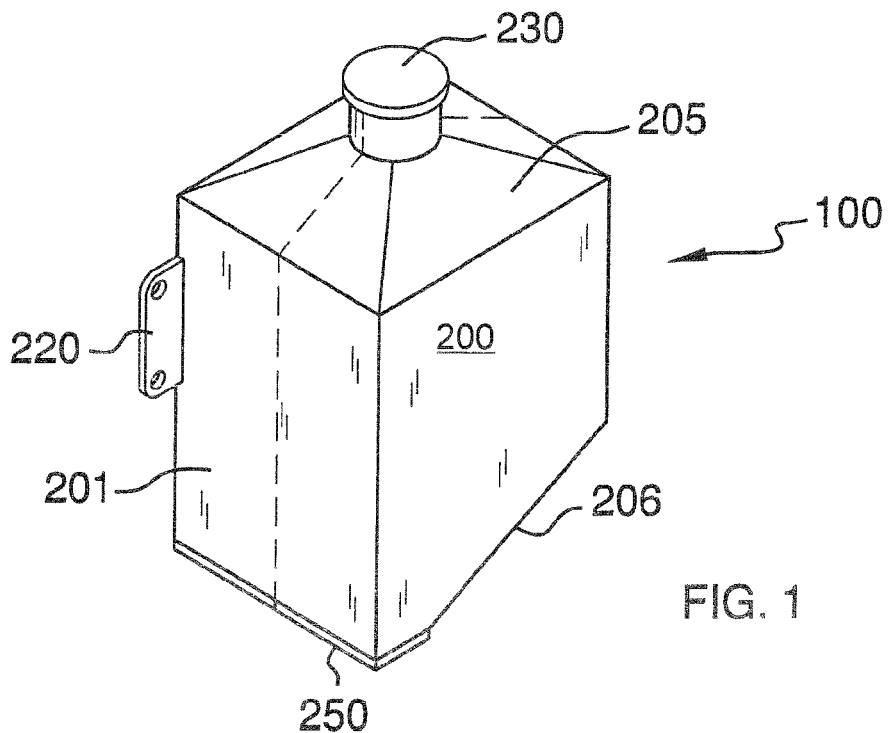
FIG. 1 is a perspective view of the traction system of the present invention.
Figure 2:
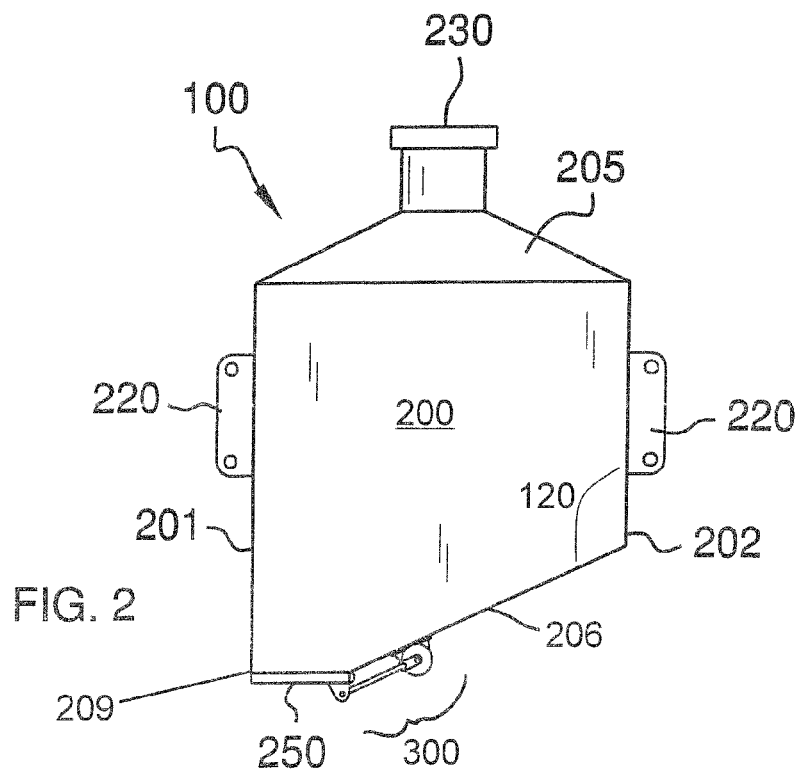
FIG. 2 is a side view of the traction system of the present invention.
Figure 3:
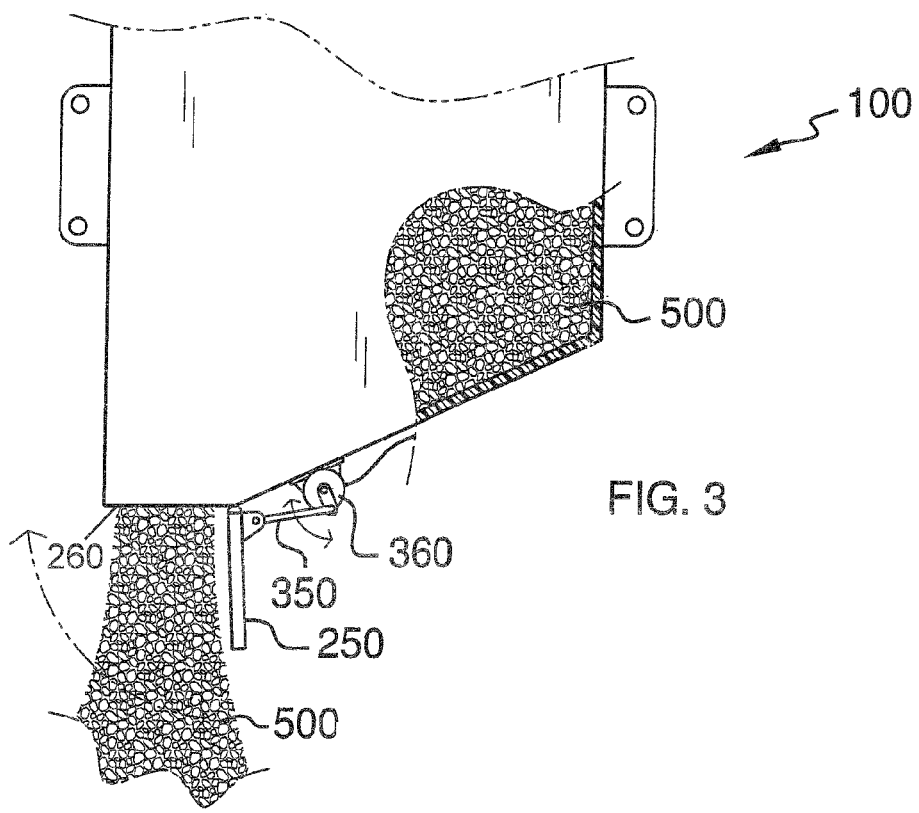
FIG. 3 is a side and cross-sectional view of the traction system of the present invention.
Figure 4:
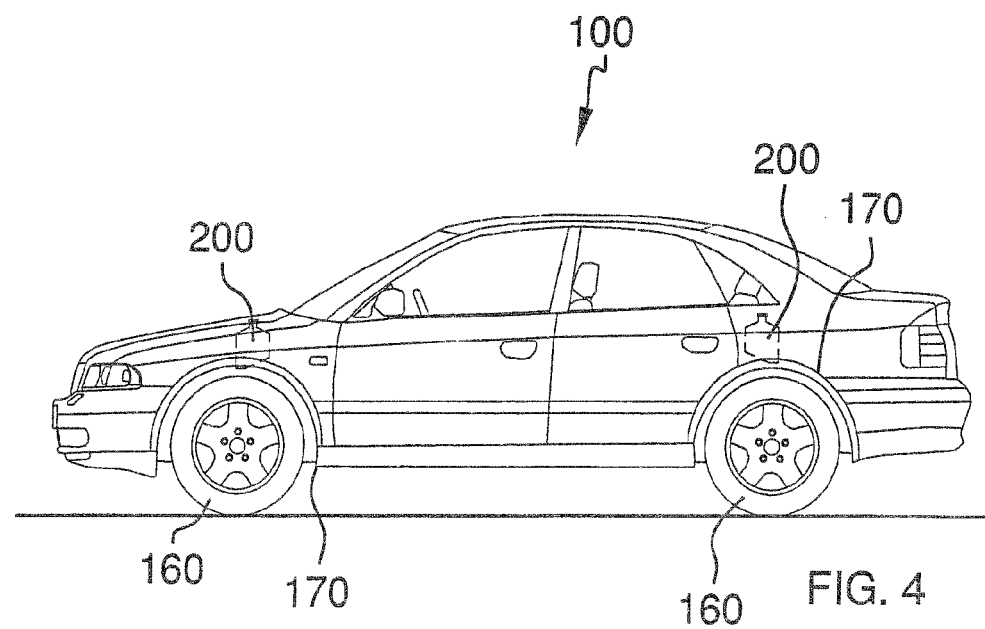
FIG. 4 is a side in-use view of the traction system as used in a vehicle.
Figure 5:
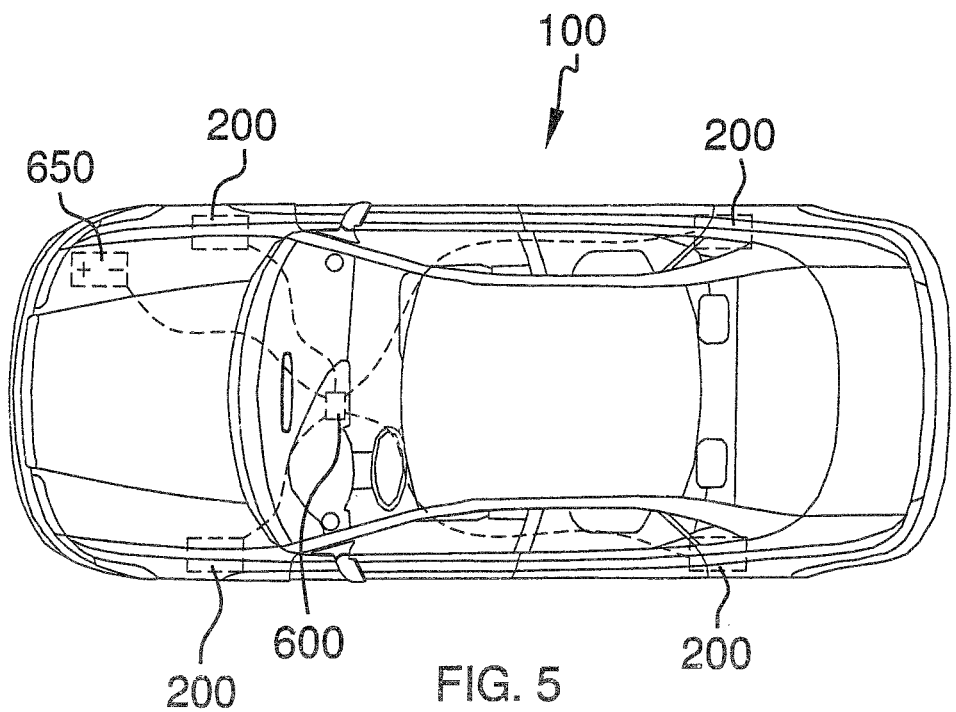
FIG. 5 is a top in-use view of the traction system as used in a vehicle.
Figure 6:
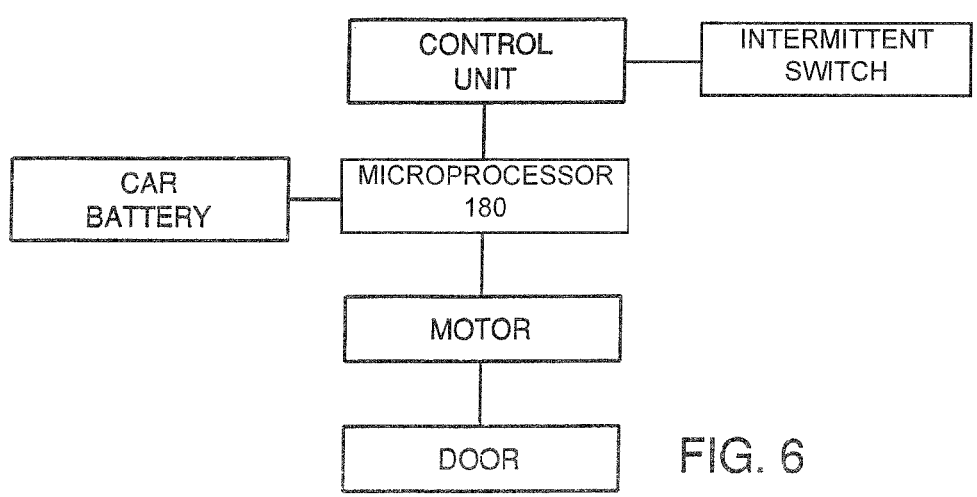
FIG. 6 is a schematic representation of the electrical components of the traction system of the present invention.

Referring now to FIGS. 1-8, the present invention features a traction system 100 for delivering a traction substance 500 to a wheel 160 of a vehicle 150. The traction substance 500 is for helping the wheel 160 attain traction on a road, for example if the road is slippery due to ice, snow, and/or mud.

The traction system 100 comprises a housing 200. The housing 200 can be installed in a wheel well of a vehicle 150 via an attachment means. In some embodiments, the attachment means comprises a mounting bracket 220 (or multiple mounting brackets 220). In some embodiments, a mounting bracket 220 is disposed on the first side 201 and/or the second side 202 of the housing 200. The attachment means is in no way limited to a mounting bracket.

Each housing 200 has a first side 210, a second side 202, a top surface 205, a bottom surface 206, and an inner cavity. The inner cavity is divided into two or more reservoirs 110, for example a first reservoir 110a and a second reservoir 110b. The reservoirs 110 are adapted to hold a traction substance 500. An internal wall 710 separates the reservoirs 110 (e.g., the first reservoir 110a and the second reservoir 110b).

The reservoirs 110 are for containing a traction substance 500 (e.g., sand). In some embodiments, a traction substance 500 comprises sand, gravel, dry ice, kitty litter, the like, or a combination thereof. The present invention is not limited to the aforementioned traction substances.

Figure 7:
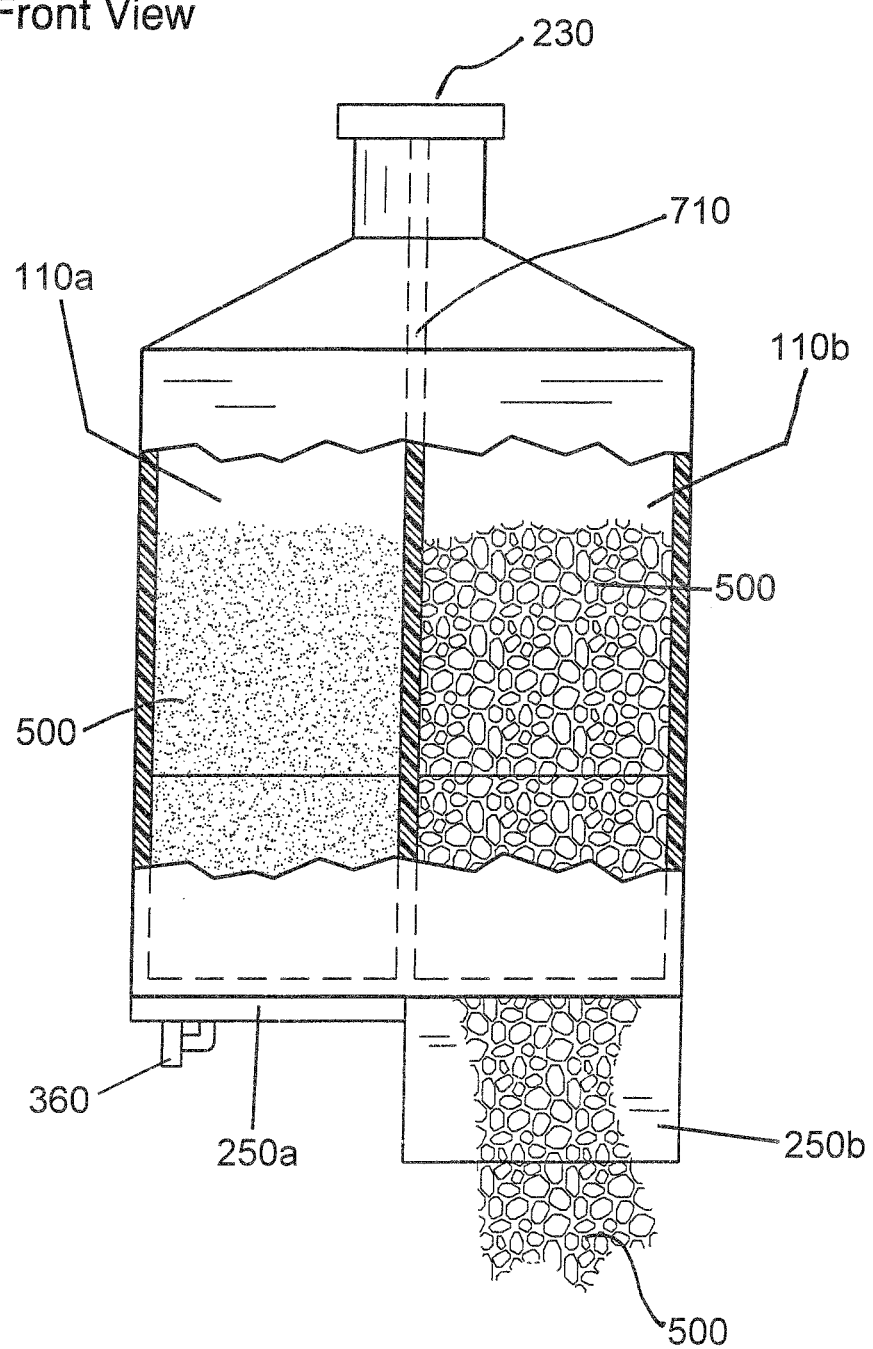
FIG. 7 is a front and internal view of the traction system of the present invention.

A top aperture 228 (e.g., filling hole) is disposed in the top surface 205 of the housing 220. The top aperture 228 provides access to the reservoirs 110 (e.g., see FIG. 7). A user can insert traction substances 500 into the reservoirs 110 via the top aperture 228. In some embodiments, a first traction substance is inserted into the first reservoir 110a and a second traction substance (different from the first traction substance) is inserted into the second reservoir 110b. In some embodiments, a cap 230 is removably attached to the top aperture 228. The cap 230 can move between at least an open position and a closed position respectively allowing and preventing access to the reservoirs 110. In some embodiments, multiple top apertures 228 are disposed in the top surface 205 of the housing 200, e.g., one top aperture 228 per reservoir 110. In some embodiments, a top aperture 228 provides access to multiple reservoirs 110. In some embodiments, the top aperture 228 is divided via the internal wall 710 (e.g., as shown in FIG. 7 and in FIG. 8A). In some embodiments, a top aperture 228 provides access to only one reservoir 110.

The bottom surface 206 of the housing 200 is at a first angle 120 with respect to the second side 202 of the housing 220. The first angle 120 helps the traction substances 500 in the reservoirs 100 fall to and collect in the dispensing portion 209 of the housing 200, the dispensing portion 209 of the housing 200 being the intersection of the first side 201 and the bottom surface 206 of the housing 200.

In some embodiments, the first angle 120 is between about 100 to 110 degrees. In some embodiments, the first angle 120 is between about 100 to 120 degrees. In some embodiments, the first angle 120 is between about 100 to 130 degrees. In some embodiments, the first angle 120 is between about 100 to 140 degrees. In some embodiments, the first angle 120 is between about 100 to 150 degrees. In some embodiments, the first angle 120 is between about 100 to 160 degrees. In some embodiments, the first angle 120 is between about 100 to 170 degrees. In some embodiments, the first angle 120 is between about 120 to 140 degrees. In some embodiments, the first angle 120 is between about 120 to 150 degrees. In some embodiments, the first angle 120 is between about 120 to 160 degrees. In some embodiments, the first angle 120 is between about 120 to 170 degrees. In some embodiments, the first angle 120 is between about 130 to 150 degrees. In some embodiments, the first angle 120 is between about 130 to 160 degrees. In some embodiments, the first angle 120 is between about 130 to 170 degrees. In some embodiments, the first angle 120 is between about 140 to 160 degrees. In some embodiments, the first angle 120 is between about 140 to 170 degrees. In some embodiments, the first angle 120 is between about 150 to 170 degrees.

An outlet hole 260 is disposed in the dispensing portion 209 of the housing 200. In some embodiments, the outlet hole 260 spans a portion of each reservoir 110 (e.g., each reservoir 110 can empty via the outlet hole 260). In some embodiments, this configuration (the outlet hole 260 spanning a portion of each reservoir 110) allows the traction substances 500 to mix as they each exit the outlet hole 260. In some embodiments, each reservoir 110 has an outlet hole 260. For example, a first outlet hole 260a is disposed in the dispensing portion 209 of the housing 200 corresponding to the first reservoir 110a (e.g., the first dispensing portion) and a second outlet hole 260b is disposed in the dispensing portion 209 of the housing 200 corresponding to the second reservoir 110b (e.g., the second dispensing portion).

Figure 8B:
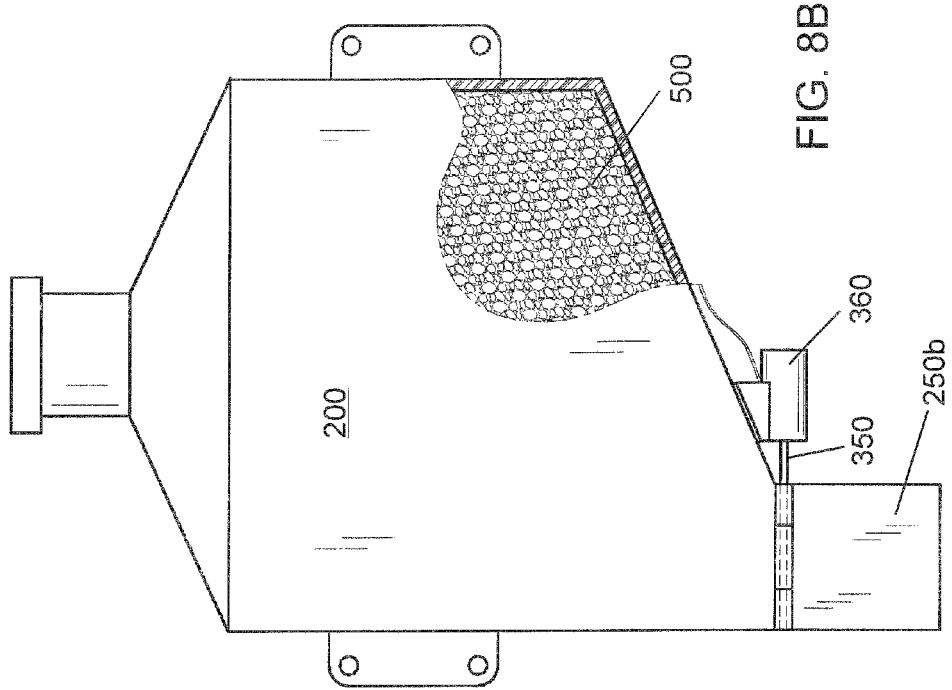
FIG. 8B is a side and internal view of the traction system of FIG. 8A.
Figure 8A:
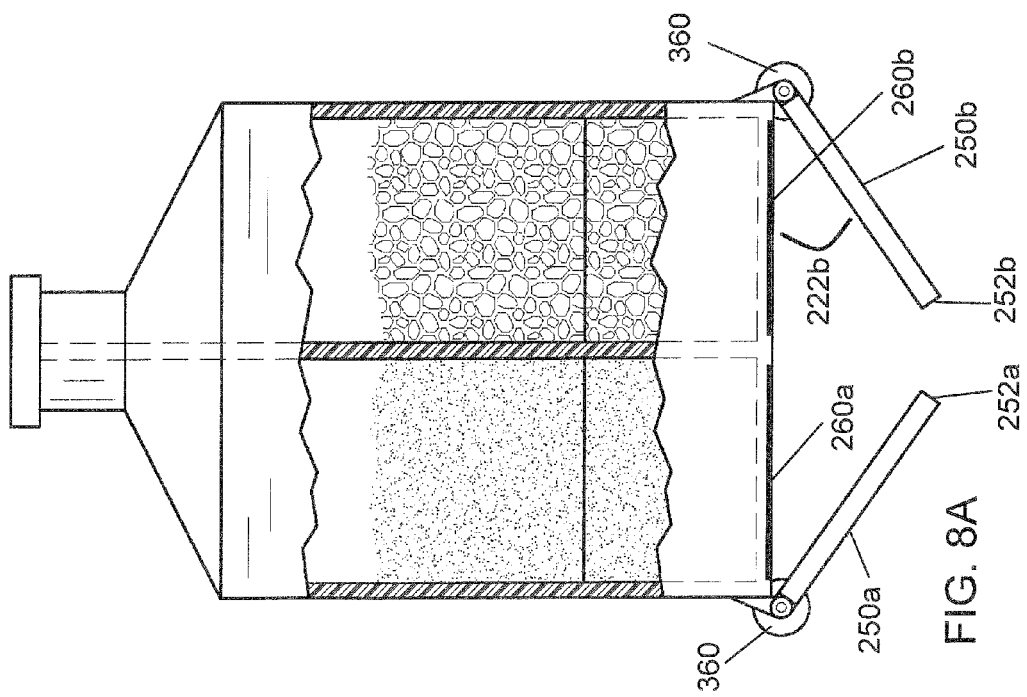
FIG. 8A is a front and internal view of the traction system of the present invention.

In some embodiments, the system 100 further comprises a door 250 that temporarily covers the outlet hole 260. In some embodiments, the system 100 further comprises a door 250 that temporarily covers each outlet hole 260. As shown in FIG. 7 and FIG. 8A, some embodiments, the system comprises a first door 250a and a second door 250b, the first door 250a temporarily covering the first outlet hole 260a and the second door 250b temporarily covering the second outlet hole 260b.

As shown in FIG. 8A, the first door 250a and the second door 250b are positioned opposite each other. For example, the free end 252a of the first door 250a faces the free end 252b of the second door 250b. When the doors 250 open, the free ends 252 of the doors 250 move away from each other (e.g., see FIG. 8A). The doors 250 can move between at least an open position (e.g., see FIG. 8A) and a closed position (e.g., see FIG. 2) respectively allowing and preventing traction substances from exiting the respective reservoirs 110 via the outlet hole 260 (or outlet holes 260). In some embodiments, the open position refers to the doors 250 being at a door angle 222 with respect to the dispensing portion 209. For example, in the open position, the first door 250a is at a first door angle 222a with respect to the dispensing portion 209 of the housing 200 and the second door 250b is at a second door angle 222b with respect to the dispensing portion 209 of the housing 200. In some embodiments, the door angles 222 are different. In some embodiments, the door angles 222 are the same.

In some embodiments, the first door angle 222a and/or the second door angle 222b is between about 10 to 20 degrees. In some embodiments, the door angle 222 is between about 10 to 30 degrees. In some embodiments, the first door angle 222a and/or the second door angle 222b is between about 10 to 40 degrees. In some embodiments, the first door angle 222a and/or the second door angle 222b is between about 10 to 50 degrees. In some embodiments, the first door angle 222a and/or the second door angle 222b is between about 10 to 60 degrees. In some embodiments, the first door angle 222a and/or the second door angle 222b is between about 10 to 70 degrees. In some embodiments, the first door angle 222a and/or the second door angle 222b is between about 10 to 80 degrees. In some embodiments, the first door angle 222a and/or the second door angle 222b is between about 20 to 30 degrees. In some embodiments, the first door angle 222a and/or the second door angle 222b is between about 20 to 40 degrees. In some embodiments, the first door angle 222a and/or the second door angle 222b is between about 20 to 50 degrees. In some embodiments, the first door angle 222a and/or the second door angle 222b is between about 20 to 60 degrees. In some embodiments, the first door angle 222a and/or the second door angle 222b is between about 20 to 70 degrees. In some embodiments, the first door angle 222a and/or the second door angle 222b is between about 20 to 80 degrees. In some embodiments, the first door angle 222a and/or the second door angle 222b is between about 30 to 40 degrees. In some embodiments, the first door angle 222a and/or the second door angle 222b is between about 30 to 50 degrees. In some embodiments, the first door angle 222a and/or the second door angle 222b is between about 30 to 60 degrees. In some embodiments, the first door angle 222a and/or the second door angle 222b is between about 30 to 70 degrees. In some embodiments, the first door angle 222a and/or the second door angle 222b is between about 30 to 80 degrees. In some embodiments, the first door angle 222a and/or the second door angle 222b is between about 40 to 50 degrees. In some embodiments, the first door angle 222a and/or the second door angle 222b is between about 40 to 60 degrees. In some embodiments, the first door angle 222a and/or the second door angle 222b is between about 40 to 70 degrees. In some embodiments, the first door angle 222a and/or the second door angle 222b is between about 40 to 80 degrees. In some embodiments, the first door angle 222a and/or the second door angle 222b is between about 50 to 60 degrees. In some embodiments, the first door angle 222a and/or the second door angle 222b is between about 50 to 70 degrees. In some embodiments, the first door angle 222a and/or the second door angle 222b is between about 50 to 80 degrees. In some embodiments, the first door angle 222a and/or the second door angle 222b is between about 60 to 70 degrees. In some embodiments, the first door angle 222a and/or the second door angle 222b is between about 60 to 80 degrees. In some embodiments, the first door angle 222a and/or the second door angle 222b is between about 70 to 80 degrees.

In some embodiments, the first door angle 222a and the second door angle 222b are both about 45 degrees.

Figure 8C:
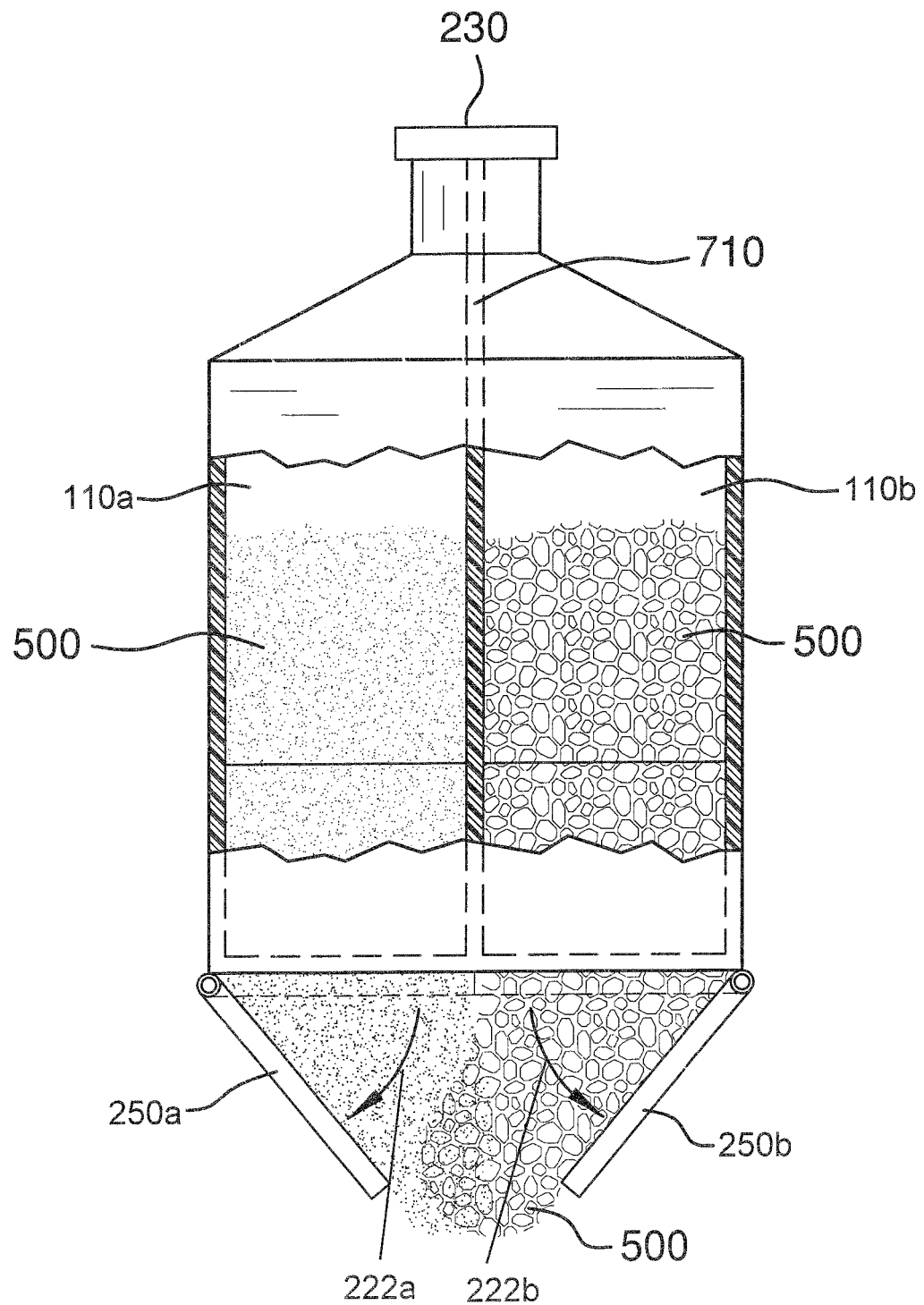
FIG. 8C is a side and internal view of the traction system of FIG. 8A wherein the doors are in the open position (e.g., the first door is at the first door angle and the second door is at the second door angle) allowing the contents of the reservoirs to move towards each other and mix as they are dispensed.

As shown in FIG. 8C, the door angles 222 of the open position allows the contents of the reservoirs 110 to move towards each other and mix as they are dispensed.

The traction system 100 further comprises a door release apparatus 300 operatively connected to the doors 250. The door release apparatus 300 moves the doors 250 between the closed and open positions. In some embodiments, the door release apparatus 300 secures the doors 250 at the door angle 222 when the doors 250 are in the open position. In some embodiments, the system 100 comprises a first door release apparatus operatively connected to the first door 250a and a second door release apparatus operatively connected to the second door 250b. In some embodiments, the door release apparatus 300 is disposed on the bottom surface 206 of the housing 200. The door release apparatus 300 is operatively connected to a power source (e.g., the battery 650 of the vehicle).

In some embodiments, the door release apparatus 300 comprises a motor 150 and a pivot arm 350 (e.g., an axle). The pivot arm 350 has a first end and a second end, the first end being connected (e.g., pivotally connected) to the doors 250 and the second end being operatively connected (e.g. pivotally connected) to the motor 360. The motor 360 is adapted to move the pivot arm 350 between a first position and a second position. When the pivot arm 350 is in the first position, the pivot arm 350 is pushed in the direction of the door 250 such that the doors 250 move to the closed position. When the pivot arm 350 is in the second position, the pivot arm 350 pulls in the direction of the second side 202 of the housing 110 such that the doors 250 moves to the open position. The motor 360 is operatively connected to the power source (e.g., battery 650 of the vehicle, the 12-volt DC electrical system of the vehicle).

The motor 360 (operatively connected to the pivot arm 350) is actuated to spin and open the doors 250 to the respective door angles 222a and 222b. Such motors are well known to one of ordinary skill in the art. When activated, one or both of the doors open at a maximum angle of less than or equal to about 80 degrees (e.g., the door angles 222 are less than or equal to about 80 degrees). In some embodiments, one or both of the doors open at a maximum angle between about 10 to 80 degrees (e.g., the door angles 222 are between about 10 to 80 degrees). In some embodiments, one or both of the doors open at a maximum angle of less than or equal to about 70 degrees (e.g., the door angles 222 are less than or equal to about 70 degrees). In some embodiments, one or both of the doors open at a maximum angle of less than or equal to about 60 degrees (e.g., the door angles 222 are less than or equal to about 60 degrees). In some embodiments, one or both of the doors open at a maximum angle of less than or equal to about 50 degrees (e.g., the door angles 222 are less than or equal to about 50 degrees). In some embodiments, one or both of the doors open at a maximum angle of less than or equal to about 40 degrees (e.g., the door angles 222 are less than or equal to about 40 degrees). In some embodiments, one or both of the doors open at a maximum angle of less than or equal to about 30 degrees (e.g., the door angles 222 are less than or equal to about 30 degrees). In some embodiments, one or both of the doors open at a maximum angle of less than or equal to about 20 degrees (e.g., the door angles 222 are less than or equal to about 20 degrees). In some embodiments, one or both of the doors open at a maximum angle of less than or equal to about 10 degrees (e.g., the door angles 222 are less than or equal to about 10 degrees). For example, the motor locks the doors at the door angles 222, the door angles being between about 10 to 80 degrees.

In some embodiments, the system 100 comprises a control switch 600 (e.g., "control unit"). In some embodiments, the control switch 600 may be affixed to the dashboard of the vehicle 150 so that the user can operate the traction device 100 while inside the vehicle 150. In some embodiments, the control switch 600 is a hard-wired switch. In some embodiments, the control switch 600 is a remote control.

The control switch 600 is operatively connected to a microprocessor 180. The microprocessor 180 is operatively connected to the motor 360. When the control switch 600 is moved to an off position, the control switch 600 sends a first input signal to the microprocessor 180 whereupon the microprocessor 180 sends a first output command to the motor 360 to cause the motor 360 to move the pivot arm 350 to the first position and the doors 250 to the closed position. When the control switch 600 is moved to an on position, the control switch 600 sends a second input signal to the microprocessor 180 whereupon the microprocessor 180 sends a second output command to the motor 360 to cause the motor 360 to move the pivot arm 350 to the second position and the doors 250 to the open position.

In some embodiments, when the control switch 600 is moved to an intermittent position, the control switch 600 sends a third input signal to the microprocessor 180 whereupon the microprocessor 180 sends a third output command to the motor 360 to cause the motor 360 to move the pivot arm 350 to the second position and the doors 250 to the open position intermittently.

In some embodiments, the system 100 comprises one housing 200. In some embodiments, the system 100 comprises two housings 200. In some embodiments, the system 100 comprises three housings 200. In some embodiments, the system 100 comprises four housings 200. In some embodiments, the system 100 comprises more than four housings 200. In some embodiments, the housing 200 comprises two reservoirs 110. In some embodiments, the housing 200 comprises three reservoirs 110. In some embodiments, the housing 200 comprises four reservoirs 110. In some embodiments, the housing 200 comprises more than four reservoirs 110.

In some embodiments, one or more housings 200 may be installed into a wheel well 170 of the vehicle 150. In some embodiments, one or more housings 200 may be installed into each wheel well 170 of the vehicle 150. In some embodiments, one or more housings 200 may be mounted just ahead of one wheel 160 at the undercarriage. In some embodiments, one or more housings 200 may be mounted just ahead of each wheel 160 of the vehicle 150 at the undercarriage. In some embodiments, one or more housings 200 may be mounted on the vehicle 150 such that they are aligned near the wheels 160.

In some embodiments, the housings 200 are constructed from a material including plastic, steel, the like, or a combination thereof. In some embodiments, the reservoirs 110 are refillable. In some embodiments, the housings 200 are replaceable. In some embodiments, the housings 200 are disposable and/or replaceable.

In some embodiments, sand may be used during conditions that are wet and/or icy. In some embodiments, dry ice may be used during muddy conditions. In some embodiments, cat litter may be used during wet or icy conditions.

In some embodiments, the traction substance 500 is released gradually from the reservoir 200. In some embodiments, the traction substance 500 is released intermittently. In some embodiments, the amount of traction substance 500 and/or the rate of release from the reservoirs 200 may be controlled by the user.

In some embodiments, each reservoir 110 has a separate door 250. In some embodiments, the control switch 600 (e.g., microprocessor) allows a user to control the release of the traction substances 500 in each reservoir 110 independently.

Example 1

Use of Traction Device of the Present Invention

A driver is driving along a dirt road that is muddy from a recent rain. His vehicle becomes stuck in a patch of mud. His vehicle has a housing mounted in each wheel well of the vehicle. The driver activates the traction system 100 of the present invention by turning the control switch 600 to the on position.

Once the system 100 is activated, the traction substance 500 (e.g., sand) is gradually released from housings 200 via the outlet holes 260 disposed in the bottom surfaces 206 of the housings 200. The traction substances 500 are directed to the wheels of the vehicle. The traction substance 500 provides the wheels extra traction, and the wheels are able to drive out of the patch of mud. The driver leaves the traction system 100 activated while he drives on the dirt road so that traction substance 500 is continuously released, thus providing the wheels extra traction while driving. This may help the tires avoid becoming stuck in another patch of mud.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

The invention claimed is:

1. A traction system comprising:
    (a) a housing having a first side, a second side, a top surface, a bottom surface, and an inner cavity, wherein the inner cavity is divided into at least a first reservoir and a second reservoir separated by an internal wall, the reservoirs are each adapted to hold a traction substance, the bottom surface of the housing is at a first angle with respect to the second side of the housing causing the traction substance to collect in a dispensing portion of the housing;
    (b) a top aperture disposed in the top surface of the housing, wherein the top aperture provides access to the reservoirs;
    (c) a first outlet hole disposed in the dispensing portion of the housing and providing access to the first reservoir and a second outlet hole disposed in the dispensing portion of the housing and providing access to the second reservoir;
    (d) a first door pivotally attached to the housing for temporarily covering the first outlet hole and a second door pivotally attached to the housing for temporarily covering the second outlet hole, wherein the doors are positioned opposite each other such that a free end of the first door faces a free end of the second door, the doors can move between at least an open position and a closed position respectively allowing and preventing access to the outlet holes, when the doors move to the open position the free ends of the doors move away from each other, in the open position the first door is at a first door angle with respect to the dispensing portion of the housing and the second door is at a second door angle with respect to the dispensing portion of the housing, the first door angle and the second door angle are each between about 10 to 80 degrees; and (e) a door release apparatus adapted to move the doors between at least the open position and the closed position, wherein the door angles of the doors in the open position allow the traction substances to mix as they are dispensed; and wherein, the door release apparatus includes motors mounted at side edges of the bottom surface, and said motors include horizontal rotating shafts extending into the doors as hinge shafts located at a bottom of the dispensing portion to pivot the first and second doors between the open and closed positions.

2. The system of claim 1, wherein the traction substance comprises sand, grave, dry ice, kitty litter, or a combination thereof.

3. The system of claim 1, wherein the first angle is between about 100 to 170 degrees.

4. The system of claim 1, wherein a mounting bracket is disposed on the first side or the second side of the housing.

5. The system of claim 1, wherein a cap is removably attached to the top aperture, the cap can move between at least an open position and a closed position respectively allowing and preventing access to the top aperture.

6. The system of claim 1, wherein the first door angle or the second door angle is between about 10 to 70 degrees.

7. The system of claim 1, wherein the first door angle or the second door angle is between about 20 to 70 degrees.

8. The system of claim 1, wherein the first door angle or the second door angle is between about 30 to 60 degrees.

9. The system of claim 1, wherein the first door angle and the second door angle are about equal.

10. The system of claim 1, wherein the first door angle and the second door angle are both about 45 degrees.

* * * * *